United States Patent
Tamm et al.

(10) Patent No.: US 8,510,264 B1
(45) Date of Patent: Aug. 13, 2013

(54) METHOD AND SYSTEM FOR APPROVING STEPS IN A MULTI-TENANT DATABASE SERVICE

(75) Inventors: Steven Tamm, San Francisco, CA (US); Walter Macklem, San Francisco, CA (US); Eric Wilson, Walnut Creek, CA (US); Varadarajan Rajaram, San Francisco, CA (US); Wendy Chang, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 379 days.

(21) Appl. No.: 12/176,007

(22) Filed: Jul. 18, 2008

Related U.S. Application Data

(60) Provisional application No. 60/950,835, filed on Jul. 19, 2007.

(51) Int. Cl.
*G06F 7/00* (2006.01)
(52) U.S. Cl.
USPC .......................................................... 707/608
(58) Field of Classification Search
USPC ..................... 707/827.694, 608; 705/301
See application file for complete search history.

(56) References Cited

U.S. PATENT DOCUMENTS

| | | | |
|---|---|---|---|
| 5,890,127 A * | 3/1999 | Buzsaki | 705/28 |
| 7,209,929 B2 | 4/2007 | Dominguez, Jr. et al. | 707/103 |
| 7,693,727 B2 * | 4/2010 | Moore | 705/2 |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | 709/203 |
| 2005/0065925 A1 | 3/2005 | Weissman et al. | 707/4 |
| 2005/0102196 A1 * | 5/2005 | Hung | 705/26 |
| 2005/0223022 A1 | 10/2005 | Weissman et al. | 707/102 |
| 2005/0278198 A1 * | 12/2005 | Huxol et al. | 705/4 |
| 2005/0283478 A1 | 12/2005 | Choi et al. | 707/9 |
| 2006/0206834 A1 | 9/2006 | Fisher et al. | 715/777 |
| 2007/0179790 A1 * | 8/2007 | Leitch et al. | 705/1 |

OTHER PUBLICATIONS

U.S. Appl. No. 60/828,192, filed Oct. 4, 2006.
U.S. Appl. No. 10/817,161, filed Apr. 2, 2004.

* cited by examiner

*Primary Examiner* — Amy Ng
(74) *Attorney, Agent, or Firm* — Zilka-Kotab, PC

(57) ABSTRACT

In accordance with embodiments, steps in a multi-tenant database service are approved to manually and/or automatically satisfy requests to approve various steps in the service. The ability of embodiments to provide such additional approval capabilities may lead to more flexible step approval during use of the on-demand database service.

23 Claims, 7 Drawing Sheets

METHOD AND SYSTEM FOR APPROVING STEPS IN A MULTI-TENANT DATABASE SERVICE

CLAIM OF PRIORITY

This application claims the benefit of U.S. Provisional Patent Application 60/950,835 entitled "METHOD AND SYSTEM FOR APPROVALS IN ON DEMAND APPLICATIONS," by Walter Macklem et al., filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to approving various steps in the context of database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to execute various steps in the context of such database systems for a variety of purposes (e.g. to approve an invoice, expenses, contract terms, a particular next step, etc.). To date, such approval processes have typically been quite inflexible and limited. Unfortunately, such limitations severely inhibit the ability to provide an effective approval process, etc.

BRIEF SUMMARY

In accordance with embodiments, there are provided mechanisms and methods for approving steps in a multi-tenant database service. These mechanisms and methods for approving steps in a multi-tenant database service can enable embodiments to manually and/or automatically satisfy requests to approve various steps in the service, in a more dynamic manner. The ability of embodiments to provide such additional approval capabilities may lead to more flexible step approval during use of the on-demand database service.

In an embodiment and by way of example, a method is provided for approving steps in a multi-tenant database service. In use, a request is received for approval of at least one of a plurality of steps in an on-demand database service. Further, criteria is identified for an approval process associated with the approval of the at least one step in the on-demand database service. Still yet, the at least one step in the on-demand database service is conditionally approved, based, at least in part, on content of the request and the criteria.

While the present invention is described with reference to an embodiment in which techniques for approving steps in a multi-tenant database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for approving steps in a multi-tenant database service.

To date, such approval process has been typically quite inflexible and limited. Such limitations severely inhibit the ability to provide an effective approval process, etc. Thus, mechanisms and methods provided herein for approving steps in a multi-tenant database service can enable embodiments to manually and/or automatically satisfy requests to approve various steps in the service, in a more dynamic manner. The ability of embodiments to provide such additional approval capabilities may lead to more flexible step approval during use of the on-demand database service.

Next, mechanisms and methods for approving steps in a multi-tenant database service will be described with reference to exemplary embodiments.

Figure 1:
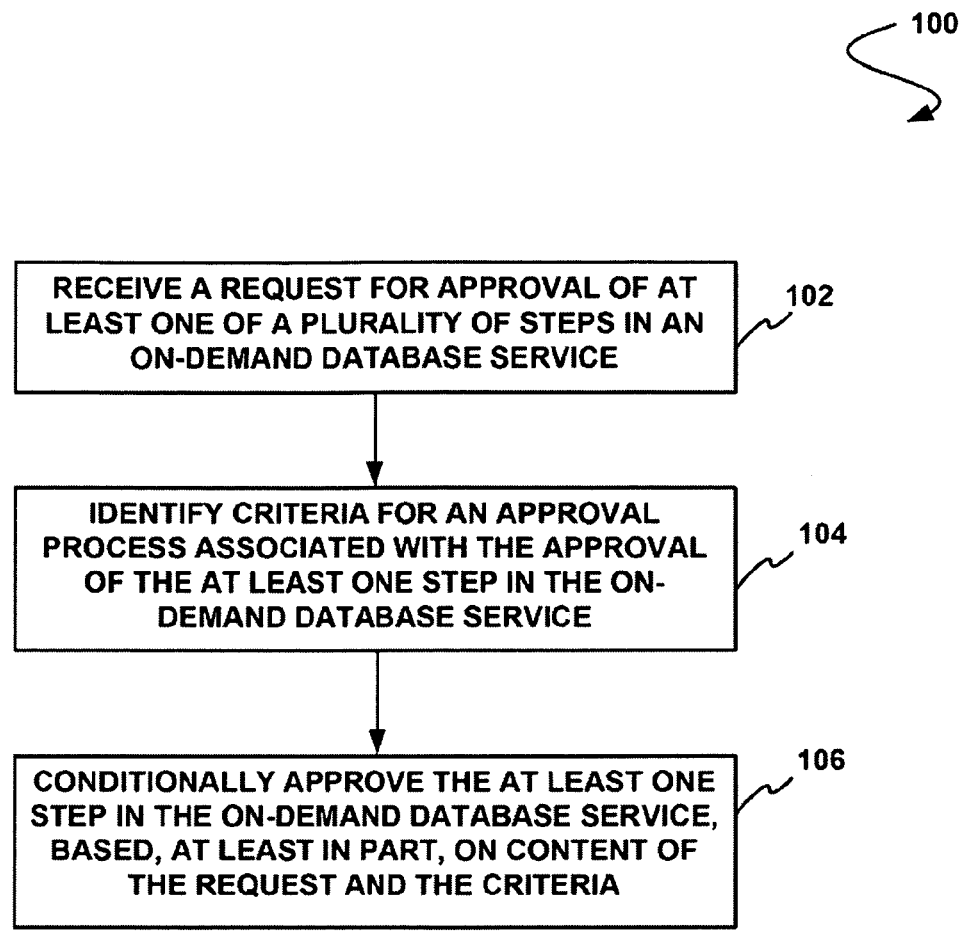
FIG. 1 shows a method for approving steps in an on-demand database service, in accordance with one embodiment.

FIG. 1 shows a method 100 for approving steps in an on-demand database service, in accordance with one embodiment. As shown, a request for approval of at least one of a plurality of steps in an on-demand database service is received. See operation 102. In the context of the present description, an on-demand database service may include any service that relies on a database system that is accessible over a network.

In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

As shown further in FIG. 1, criteria for an approval process associated with the approval of the at least one step in the on-demand database service is identified. See operation 104. The criteria may be any criteria associated with an approval process.

For example, in one embodiment, the criteria may be defined by an expression. In this case, the expression may include a formulaic or non-formulaic expression. As an option, the criteria may be associated with at least one field of a database of the on-demand database service. Additionally, the criteria may be user configurable.

With further reference to FIG. 1, the at least one step in the on-demand database service is conditionally approved, based, at least in part, on content of the request and the criteria. See operation 106. For example, if the at least one step in the on-demand database service is approved, a process may progress to a next sequential step of the plurality of steps, or the process may skip at least one of the steps. On the other hand, if the at least one step in the on-demand database service is not approved, a process may revert to a previous sequential step of the plurality of steps, or the process may revert multiple previous sequential steps of the plurality of steps, or the process may enter a final reject state.

In one embodiment, an additional request for approval of at least another one of the plurality of steps in the on-demand database service may also be received. In this case, different criteria may be identified for an approval process associated with the approval of at least one other step in the on-demand database service, and the at least one other step in the on-demand database service may be conditionally approved, based, at least in part, on content of the additional request and the different criteria for the approval process associated with the approval of at least one other step in the on-demand database service It should be noted that the approval request may be automatically executed or manually executed, in various embodiments. As an option, the approval request may be manually executed utilizing an electronic mail message. For example, the request for approval may be included in, or in the form of an email, webpage, etc. In these cases, the conditional approval may be executed utilizing an acceptance feature included in the electronic message.

Furthermore, in one embodiment, an authentication procedure may be required before the approval request can be manually executed. For example, a login may be required before the approval request can be manually executed. As another option, an electronic key may be required before the conditional approval can be manually executed. This electronic key may be generated uniquely per approval request and may not be re-used after the approval request has been completed.

In one embodiment, the request for approval may be capable of being canceled. In this case, a cancel indication for cancelling the request may be received. Subsequently, the request may be cancelled in response to the cancel indication.

Figure 2A:
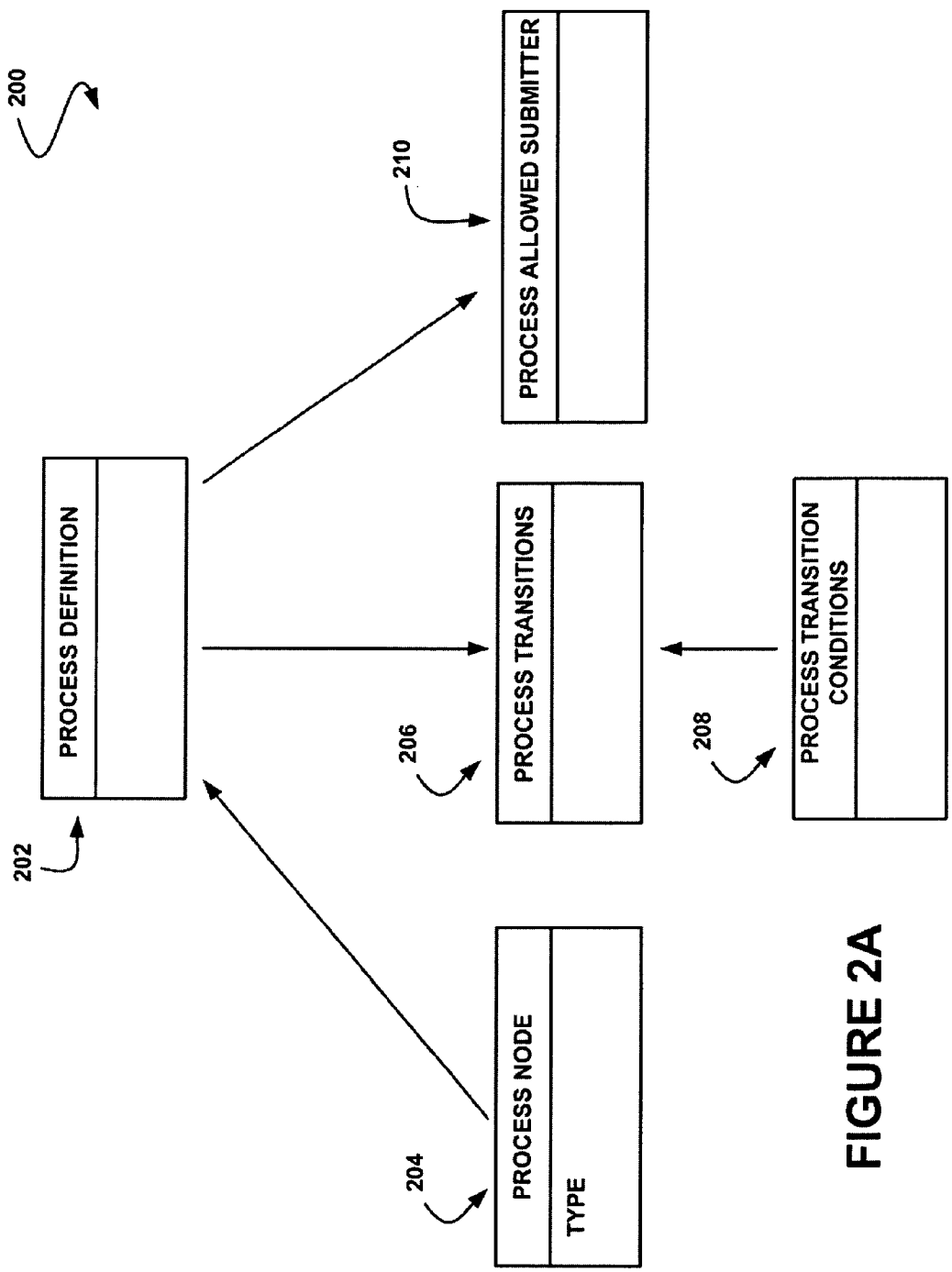
FIG. 2A shows a design time model for approving steps in an on-demand database service, in accordance with one embodiment.

FIG. 2A shows a design time model 200 for approving steps in an on-demand database service, in accordance with one embodiment. As an option, the model 200 may be implemented in the context of the functionality of FIG. 1. Of course, however, the model 200 may be implemented in any desired environment. The aforementioned definitions may apply during the present description.

As shown, the design time model 200 includes one or more approval process definitions 202. Additionally, the approval process definitions 202 may each include one or more process nodes 204 and one or more process transitions 206. Furthermore, each process transition 206 may include one or more process transition conditions 208.

In one embodiment, multiple approval process definitions 202 may be defined. In this case, there may be an order in which the approval process definitions 202 are evaluated or attempted to be evaluated. As an option, each approval process definition 202 may have criteria that will prevent a request for approval from entering the approval process. In that situation, that particular approval process definition may be ignored and the criteria for the next approval process definition may be evaluated.

As another option, each approval process definition 202 may only allow certain users to enter that approval process definition 202. In one embodiment, this may be a user configurable option. This option may serve to limit submitters (e.g. users that are requesting an approval) to be a certain user in the organization, a certain group of users in the organization, or a user of a certain role in the organization. These submitters may be associated with a database table corresponding to the approval process definition 202 shown as a process allowed submitter 210 in FIG. 2.

It should be noted that, in one embodiment, all rows in the database tables represented by items 202-210 of FIG. 2 may be cached in a cache server. This may allow for very quick retrieval of approval process information.

Figure 2B:
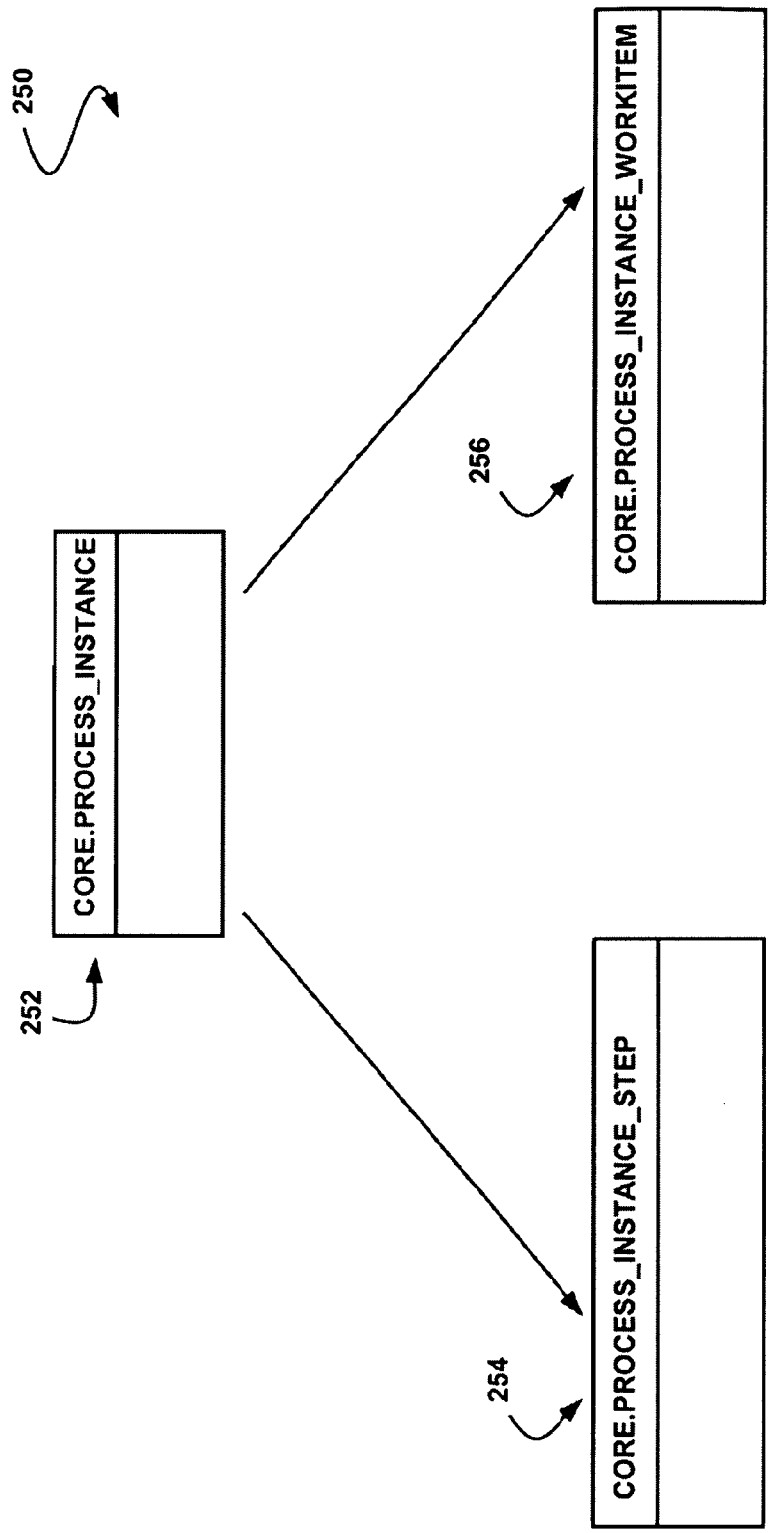
FIG. 2B shows a run time model for approving steps in an on-demand database service, in accordance with one embodiment.

FIG. 2B shows a run time model 250 for approving steps in an on-demand database service, in accordance with one embodiment. As an option, the model 250 may be implemented in the context of the functionality of FIGS. 1 and 2A. Of course, however, the model 250 may be implemented in any desired environment. Additionally, the aforementioned definitions may apply during the present description.

As shown, a process_instance table 252, a process_instance_step table 254, and a process_instance_workitem table 256 are provided. The process_instance_step table 254 may include history data that may be used by a soft rejection to determine which user should receive a rejected approval request. The process_instance_workitem table 256 may represent which approval requests currently exist.

In operation, an approval request may be triggered based on a user submission. In one embodiment, such approval request may include a workflow approval request. In this case, a new workflow controller may be instantiated in order to evaluate the transitions associated with the various processes. As an option, the workflow approval may be triggered automatically.

All instances of a workflow process may be stored in the process_instance table 252. This may refer to both active and historical instances. All of the steps of those instances may be stored in the process_instance_step table 254.

Once an approval is initiated based on the user submission, the workflow controller may begin by checking the process_instance table 252 to see if a current instance exists. If a current instance does not exist, the workflow controller may try to evaluate the transition conditions for the start transition for all the given processes, instantiate the workflow process, and update a database including the tables. If a current instance does exist, the workflow controller may examine the current state of the workflow, along with work items, and evaluate the transition condition. In this case, the transition condition may include an approval or rejection by the user.

When a transition is taken, the workflow controller may update the database with the new state of the object, lock the object if necessary, and queue all of the transition actions. At the end of the workflow processing on all objects, all of the actions may be unqueued and executed in bulk.

In one embodiment, the list of workflow processes for an organization may be stored in a cache server on a per entity basis as part of a "RuleCacheSet." A "WFProcessInfo" class may also be created to hold the workflow process definition from the database, including all of its subsidiary tables.

It should be noted that, in some cases when a record is in the workflow, and in some cases when the approval process is finished, the record may be prevented from being modified, even in public organizations. To accomplish this, an external table (e.g. an entity_lock table) may be utilized to prevent rows from being edited and to override sharing and all other permissions, with the optional exception of a modify all data permission.

As an option, this entity_lock table may also contain "exceptions" that may be used in the future to allow a user with a work item the ability to modify the record without a modify all data permission. In this case, all regular access checks for editing data may check for the existence of a lock. If a lock is found, an "Entity is Locked" notification may be displayed. In one embodiment, locks may also apply to child objects in master-detail relationships, line items, and/or order items.

Figure 3:
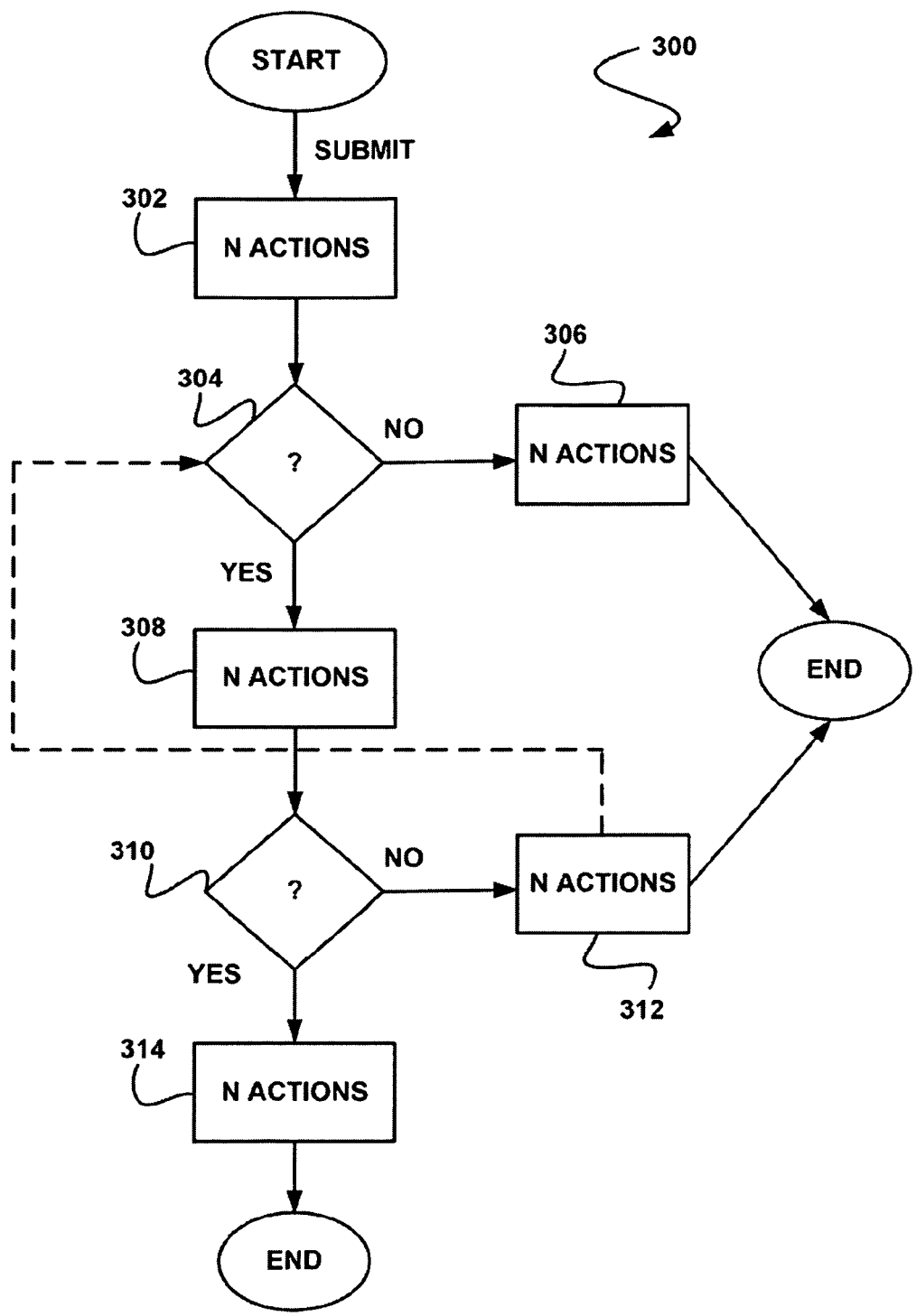
FIG. 3 shows a process definition method for approving steps in an on-demand database service, in accordance with one embodiment.

FIG. 3 shows a process definition method 300 for approving steps in an on-demand database service, in accordance with one embodiment. As an option, the present method 300 may be implemented in the context of the functionality of FIGS. 1-2. Of course, however, the method 300 may be carried out in any desired environment. Again, the aforementioned definitions may apply during the present description.

As shown, a request for approval of at least one of a plurality of steps in an on-demand database service is submitted and a number of actions (e.g. N) are performed, in response to the submission. See operation 302. In this case, the request for approval may be submitted automatically in response to a user modifying a field in a data structure, submitting a time sheet, and/or any other task.

Decision criteria is then used to determine whether the request for approval of the steps should be approved or rejected. See operation 304. In this case, the decision criteria in operation 304 may represent a process node in the process definition. Furthermore, the transitions resulting from such decision may represent process transitions associated with the process definition.

If it is determined, based on the criteria, that the request for approval is rejected, actions may be performed in response to the rejection and the approval process may end. See operation 306. In one embodiment, if it is determined that the request for approval is rejected based on a first set of approval criteria, actions may be performed in response to the rejection and the approval process may be reevaluated utilizing the approval criteria or other approval criteria.

If it is determined, based on the criteria, that the request for approval is approved, actions may be performed in response to the approval. See operation 308. Subsequently, additional criteria may be used to determine whether to approve or reject additional steps associated with the request for approval. See operation 310.

It should be noted that this additional criteria may be the same or different criteria than the criteria used in the initial approval determination. If it is determined, based on the additional criteria, that the request for approval is rejected, actions may be performed in response to the rejection and the approval process may end. See operation 312. Again, in one embodiment, if it is determined that the request for approval should be rejected, actions may be performed in response to the rejection and the approval process may be reevaluated utilizing the additional approval criteria or other approval criteria.

If it is determined, based on the additional criteria, that the request for approval is approved, actions may be performed in response to the approval. See operation 314. Subsequently, other criteria may be used to determine whether to approve or reject additional steps associated with the request for approval or the approval process may end.

Figure 4:
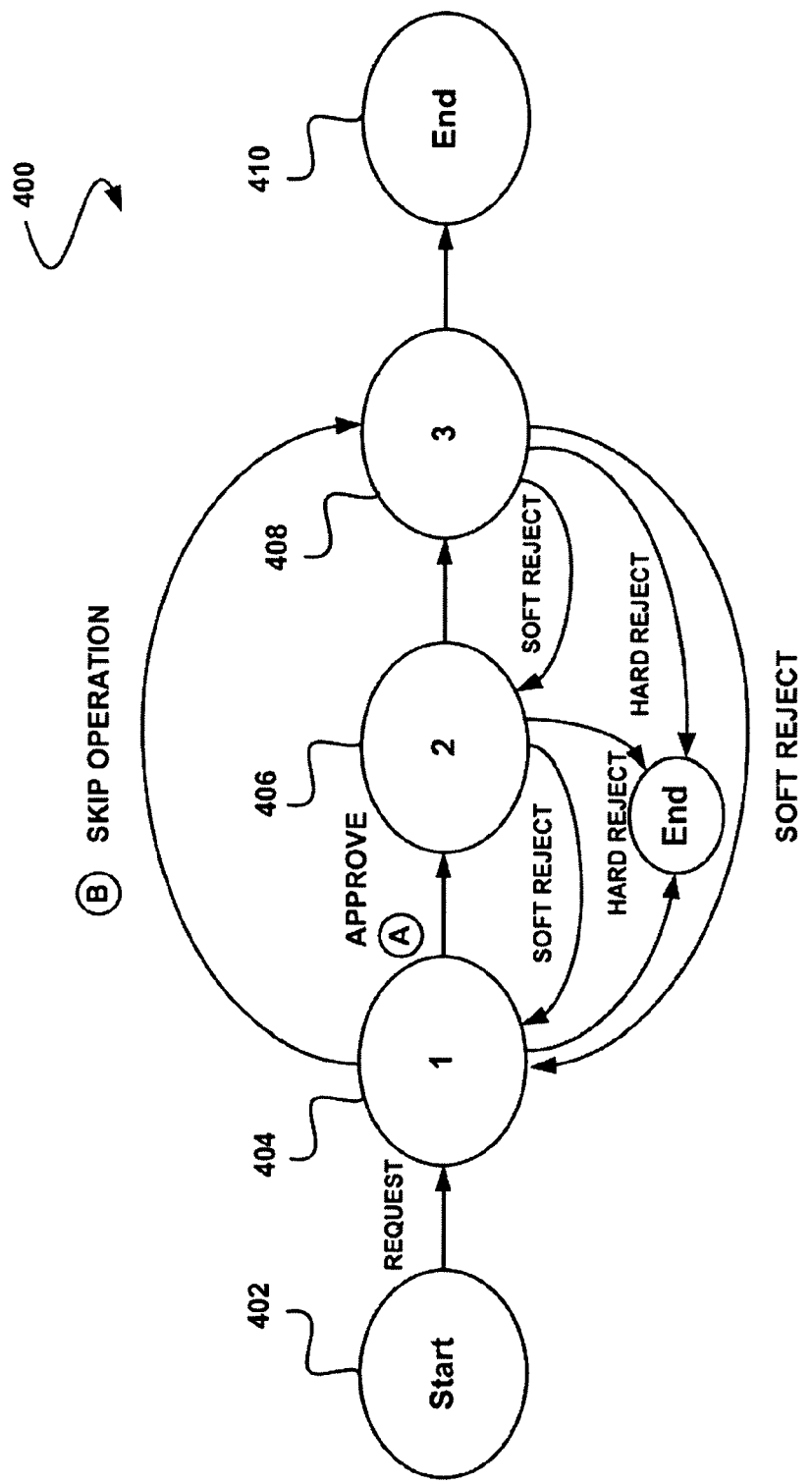
FIG. 4 shows a state diagram for approving steps in an on-demand database service, in accordance with one embodiment.

FIG. 4 shows a state diagram 400 for approving steps in an on-demand database service, in accordance with one embodiment. As an option, the present state diagram 400 may be implemented in the context of the functionality of FIGS. 1-3. Of course, however, the state diagram 400 may be implemented in any desired environment. Further, the aforementioned definitions may apply during the present description.

As shown, a virtual start node 402 points to a first node 404, which corresponds to a first step in an approval process. The first node 404 points to a second node 406, which corresponds to a second step in the approval process. Similarly, the second node 406 points to a third node 408, which corresponds to a third step in the approval process.

It should be noted that, in various embodiments, any number of nodes may be included as part of the approval process. Furthermore, any nodes within the approval process may point to a subsequent node, a previous node, and/or any other node. Thus, the first node 404 may point to the third node 408, indicating that, in some cases, the second step in the approval process may be skipped. Additionally, the last step in the approval process, which is signified by the third node 408 in this case, may point to a virtual end node 410 which indicates the end of the approval process.

In operation, a request for approval of a record may be received. The approval criteria may then determine whether the record should enter into the first step represented by the first node 404. Upon entering the first step, a user in the system may now decided whether to approver or reject the record.

If it is determined to approve the record, a second step in the approval process, represented by the second node 406, may then be entered and the user may determine whether to approve or reject the record. If it is determined by the user to reject the record, the state of the approval process may transition back to the first step. As another option, the approval process may also transition to an end state.

If it is determined to approve the record, the state of the approval process may transition to a third step, represented by the third node 408. Once all of the approval steps have been evaluated, and if it is determined that the record is to be approved, the state of the approval process may then transition to an end state, represented by the virtual end node 410, which may indicate approval of the record.

It should be noted that at a given node, many transition conditions and/or transition options may exist. For example, at the third node 408 the state of the process may transition to a node immediately preceding the third node 408 with a soft reject, or to another preceding node, such as the first node 404. Similarly, a node following a given node may be skipped based on an evaluation using a set of criteria. For example, the approval process may be configured such that the first node 404 may transition to the third node 408 using a skip operation. Thus, users may be able to configure an approval process where steps may be conditionally skipped.

As an example, a "draft contract" operation may need to be approved before it becomes a fully executable contract. This application may be built using some standard objects and some custom objects. In this case, the "draft contract" operation may be an opportunity object. Once a draft contract is created and submitted for approval, it may follow a chain of approval based on criteria such as a project that the draft contract is associated with, a studio that is working on this project, a contract amount (i.e. opportunity amount), etc. In this case, the approval chain may be represented by the steps shown in Table 1.

TABLE 1

| Approval Step | Approval Source | Criteria |
|---|---|---|
| 1 | Approval by Budget Owner | No criteria |
| 2 | Approval by Finance | No criteria |
| 3 | Approval by Studio VP | Opportunity Amount >$25000 |
| 4 | Approval by Legal | No criteria |

If criteria is provided and the criteria is evaluated as false, the approval process may stop. With skip functionality, the administrator may configure the approval process to skip the current step and go to the next step. For example, Table 2 shows pseudo-code that may be associated with step 3, in accordance with one embodiment.

TABLE 2

STEP 3 - Opportunity Amount >25000 Send to "VP"
    If False
        * Stop Approval Process (default behavior)
        * SKIP this step and continue to next step In one embodiment, a skipped step may be routed if the next step rejects the approval request and the administrator has configured the rejection behavior to be "Go Back to Previous Step." Table 3 shows pseudo-code representing such an example, in accordance with one embodiment.

TABLE 3

STEP 1 - <no criteria> Send to "Manager"
STEP 2 - Opportunity Amount >25000 Send to "Manager"
    If False
        * SKIP this step and continue to next step
STEP 3 - <no criteria> Send to "Manager"
    If Rejected
        * Go Back 1 Step In this case, if the approver in step 3 rejects the request, it may be routed to step 1 or the last previous approved step. If there are no previous steps, then the approval process may be rejected.

If all steps are skipped in an approval process, the approval record may be approved or rejected based on an option defined for that process. In one embodiment, the default option may be to reject the request. In another embodiment, the default option may be to approve the request. As another option, an administrator may not be provided the skip option on the last step. For example, the approval process may be configured to automatically stop.

As an option, the approval processes may be configured as a graph including nodes (i.e. approval steps) and transitions among the nodes. In one embodiment, the steps may be configured to execute in a sequential order. If the approval request does not meet filter criteria associated with the steps, the approval request may automatically be approved or rejected, depending on the configuration.

Skip operations may also be utilized to allow for more dynamic approvals. In one embodiment, the design of skippable steps may be based on inserting more approval and rejection transitions into the graph and managing the existing transitions.

For example, there may be four steps in an approval process. In this case, there may be transitions from step 1 to step 2, step 2 to step 3, and step 3 to step 4. The second step may be made skippable. This may be accomplished using a new transition from step 1 to step 3 that has the same filter criteria as the criteria for the transition from step 2 to step 3. An ordering of these transitions may also be enforced such that the transition from step 2 to step 3 is evaluated before step 1 to step 3.

In order to make step 3 skippable, a new transition from step 2 to step 4 may be created in addition to a new transition from step 1 to step 4 for the case when both step 2 and step 3 are skipped. It should be noted that some operations which may be considered for skippable steps may require altering the graph. These operations may include editing a step to switch it from non-skippable to skippable, editing a step to switch it from skippable to non-skippable, inserting a step directly before or after a skippable step, and deleting a step that is directly before or after a skippable step.

In some cases, performing delta calculations to detect skippable steps, cloning transitions, and reassigning transitions may be challenging to code and evaluate from a quality assurance perspective. However, when implemented in a graphical configuration, each of these operations may simply result in a recalculation of the graph, which makes the operation more manageable.

For example, skippable/unskippable behavior may be recorded for each step. All cloned transitions may then be deleted. In this case, a transition identifier may be used to identify the cloned transitions, the transition identifier indicating that the transition is a cloned transition.

A user operation may then be performed. In this case, the user action may include switching the skippable behavior, inserting a new step, and/or deleting a step. The graph may then be recalculated. For instance, starting from the last node and working towards the first node, it may be determined whether the step is skippable.

If the step is not skippable, no change may be made to that step. If the step is skippable, all outgoing approval transitions may be cloned from the current node and an identifier indicating from which node the transition was cloned may be updated to be the previous node. Additionally, all incoming rejection transitions may be cloned from the current node and an identifier indicating from which node the transition was cloned may be updated to be the previous node. In one embodiment, this may be implemented in the case of the soft-rejection. Editing properties that reside on the transition may also be copied to all of the cloned transitions.

System Overview

Figure 5:
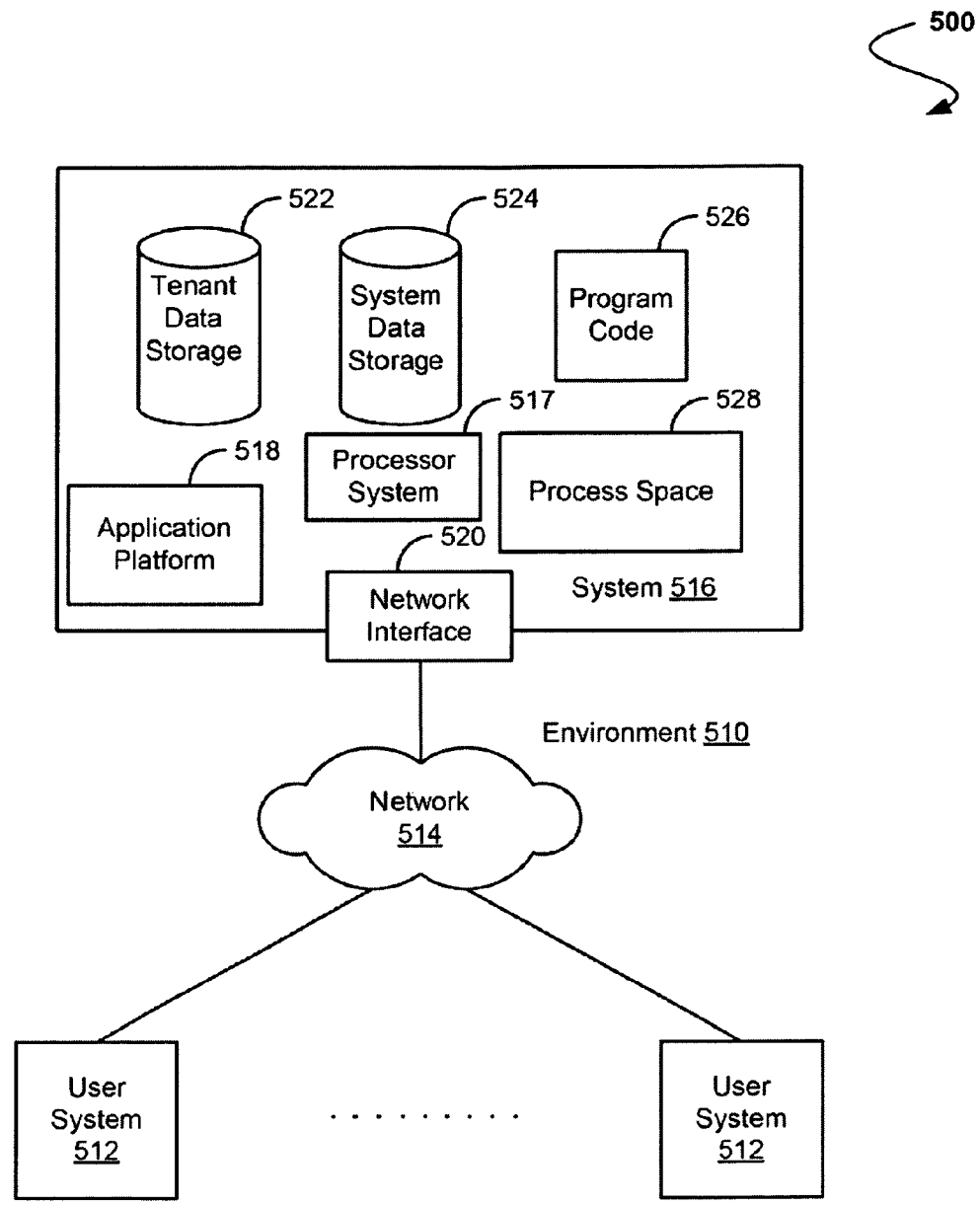
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
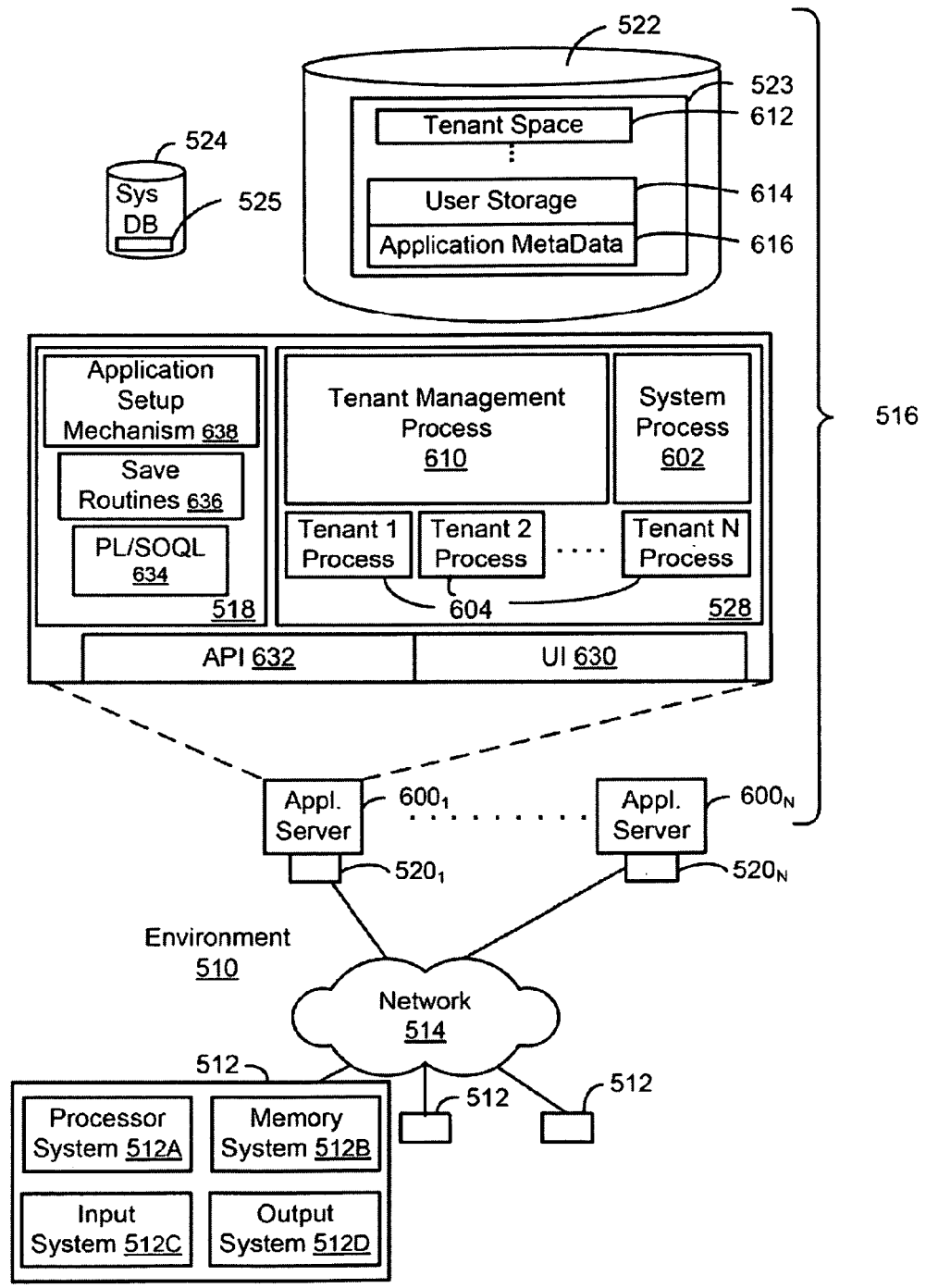
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 6 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD); microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, IMPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 530, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600₁ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g. an application server 600 in system 516) automatically generates one or more SQL statements (e.g. one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
receiving a request for approval of content;
executing an approval process for approving the content, in response to the request, including:
identifying a plurality of sequentially ordered steps of the approval process in an on-demand database service, wherein the sequentially ordered steps are steps ordered in a linear sequence;
conditionally approving each of the sequentially ordered steps, according to the ordering of the steps, such that the approval process only includes the sequentially ordered steps each of which are conditionally approvable according to the linear sequence thereof, including:
identifying criteria for approval of each of the sequentially ordered steps in the on-demand database service; and
conditionally approving each of the sequentially ordered steps in the on-demand database service, based, at least in part, on an evaluation of the criteria with respect to the content;
wherein each of the sequentially ordered steps is associated with a transition, the transition for at least one of the sequentially ordered steps including at least one of skipping over a next step in the sequentially ordered steps to another step immediately succeeding the skipped over next step and reverting to a previous step in the sequentially ordered steps;
wherein, if one of the sequentially ordered steps in the on-demand database service is approved, the approval process skips over at least one of the other sequentially ordered steps to a target one of the sequentially ordered steps immediately succeeding the skipped over at least one of the other sequentially ordered steps.

2. The method of claim 1, wherein the criteria is defined by an expression.

3. The method of claim 2, wherein the expression includes a formulaic expression.

4. The method of claim 1, wherein, another transition for at least a second one of the sequentially ordered steps includes progressing to a next step in the ordered steps immediately succeeding the second one of the sequentially ordered steps.

5. The method of claim 1, wherein, if the one of the sequentially ordered steps in the on-demand database service is not approved, the approval process reverts to a previous step in the sequentially ordered steps that is previous to the one of the sequentially ordered steps.

6. The method of claim 1, wherein, if the one of the sequentially ordered steps in the on-demand database service is not approved, the approval process reverts multiple previous steps in the sequentially ordered steps.

7. The method of claim 1, wherein the conditional approval is automatically executed.

8. The method of claim 1, wherein the conditional approval is manually executed.

9. The method of claim 8, wherein an authentication procedure is required before the conditional approval can be manually executed.

10. The method of claim 8, wherein the conditional approval is manually executed, utilizing an electronic mail message.

11. The method of claim 1, and further comprising receiving a cancel indication for cancelling the request, and cancelling the request in response to the cancel indication.

12. The method of claim 1, wherein the criteria is user configurable.

13. The method of claim 1, wherein the criteria is associated with at least one field of a database of the on-demand database service.

14. The method of claim 1, wherein the on-demand database service includes a multi-tenant on-demand database service.

15. The method of claim 1, wherein the transition is configured for the associated ordered step.

16. The method of claim 1, wherein at least one of the ordered steps is associated with multiple transitions.

17. The method of claim 16, wherein one of the transitions is performed based on an evaluation of the criteria.

18. The method of claim 17, wherein if the criteria evaluates to true, a first one of the transitions is performed, and if the criteria evaluates to false, a second one of the transitions is performed.

19. The method of claim 1, wherein the criteria is different for at least a portion of the sequentially ordered steps.

20. The method of claim 1, wherein the approval of the content is provided in response to approval of a last step in the sequentially ordered steps.

21. The method of claim 1, wherein the approval of the content is denied in response to not approving, in response to the evaluation of the criteria, one of the sequentially ordered steps.

22. A non-transitory computer-readable medium storing one or more sequences of instructions which, when executed by one or more processors, cause the one or more processors to carry out the steps of:

receiving a request for approval of content;

executing an approval process for approving the content, in response to the request, including:

identifying a plurality of sequentially ordered steps of the approval process in an on-demand database service, wherein the sequentially ordered steps are steps ordered in a linear sequence;

conditionally approving each of the sequentially ordered steps, according to the ordering of the steps, such that the approval process only includes the sequentially ordered steps each of which are conditionally approvable according to the linear sequence thereof, including:

identifying criteria for approval of each of the sequentially ordered steps in the on-demand database service; and conditionally approving each of the sequentially ordered steps in the on-demand database service, based, at least in part, on an evaluation of the criteria with respect to the content;

wherein each of the sequentially ordered steps is associated with a transition, the transition for at least one of the sequentially ordered steps including at least one of skipping over a next step in the sequentially ordered steps to another step immediately succeeding the skipped over next step and reverting to a previous step in the sequentially ordered steps;

wherein, if one of the sequentially ordered steps in the on-demand database service is approved, the approval process skips over at least one of the other sequentially ordered steps to a target one of the sequentially ordered steps immediately succeeding the skipped over at least one of the other sequentially ordered steps.

23. An apparatus, comprising:

a processor; and one or more stored sequences of instructions which, when executed by the processor, cause the processor to carry out the steps of:

receiving a request for approval of content;

executing an approval process for approving the content, in response to the request, including:

identifying a plurality of sequentially ordered steps of the approval process in an on-demand database service, wherein the sequentially ordered steps are steps ordered in a linear sequence;

conditionally approving each of the sequentially ordered steps, according to the ordering of the steps, such that the approval process only includes the sequentially ordered steps each of which are conditionally approvable according to the linear sequence thereof, including:

identifying criteria for approval of each of the sequentially ordered steps in the on-demand database service; and conditionally approving each of the sequentially ordered steps in the on-demand database service, based, at least in part, on an evaluation of the criteria with respect to the content;

wherein each of the sequentially ordered steps is associated with a transition, the transition for at least one of the sequentially ordered steps including at least one of skipping over a next step in the sequentially ordered steps to another step immediately succeeding the skipped over next step and reverting to a previous step in the sequentially ordered steps;

wherein, if one of the sequentially ordered steps in the on-demand database service is approved, the approval process skips over at least one of the other sequentially ordered steps to a target one of the sequentially ordered steps immediately succeeding the skipped over at least one of the other sequentially ordered steps.

\* \* \* \* \*